United States Patent
Kasamatsu et al.

(10) Patent No.: US 10,126,072 B2
(45) Date of Patent: Nov. 13, 2018

(54) HEAT STORAGE UNIT AND HEAT STORAGE SYSTEM

(71) Applicant: DENSO CORPORATION, Kariya, Aichi-pref. (JP)

(72) Inventors: Shinya Kasamatsu, Kariya (JP); Eiichi Okuno, Kariya (JP); Yasushi Kouno, Kariya (JP); Takuya Fuse, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/506,931

(22) PCT Filed: Sep. 22, 2015

(86) PCT No.: PCT/JP2015/004817
§ 371 (c)(1),
(2) Date: Feb. 27, 2017

(87) PCT Pub. No.: WO2016/051728
PCT Pub. Date: Apr. 7, 2016

(65) Prior Publication Data
US 2017/0276436 A1    Sep. 28, 2017

(30) Foreign Application Priority Data
Sep. 30, 2014 (JP) .................. 2014-201437

(51) Int. Cl.
*F28D 20/02* (2006.01)
*C09K 5/02* (2006.01)
(Continued)

(52) U.S. Cl.
CPC ............... *F28D 20/02* (2013.01); *C09K 5/02* (2013.01); *C09K 5/14* (2013.01); *F28D 20/0056* (2013.01); *F28D 21/0003* (2013.01); *F28F 5/02* (2013.01)

(58) Field of Classification Search
CPC .. F28D 20/02; F28D 20/0056; F28D 21/0003; F28D 17/026; F28D 19/042;
(Continued)

(56) References Cited

U.S. PATENT DOCUMENTS 2,667,034 A * 1/1954 Alcock ................... F02C 7/105
                                                           60/497
2,846,195 A * 8/1958 Alcock ................. F28D 19/045
                                                            165/7
(Continued)

FOREIGN PATENT DOCUMENTS

| CN | 101825412 A | 9/2010 |
|---|---|---|
| JP | S57-150796 A | 9/1982 |

(Continued)

OTHER PUBLICATIONS

Guenon et al, Electrical breakdown in a $V_2O_3$ device at the insulator-to-metal transition, EPL, 101(2013) 57003, Mar. 2013, p. 1-p. 5.

*Primary Examiner* — Justin Jonaitis
(74) *Attorney, Agent, or Firm* — Posz Law Group, PLC

(57) ABSTRACT

A heat storage unit or a heat storage system is a heat storage unit including: a heat storage portion having a first material with a strongly correlated electron system material; and a heat conduction portion having a second material higher in a thermal conductivity than the first material and being in contact with the heat storage portion. The heat storage unit may have a laminated structure in which the heat storage portion and the heat conduction portion are alternately laminated on each other. For example, a metal-insulator phase transition material or a transition metal oxide may be used as the strongly correlated electron system material. The second material may be metal or ceramics.

11 Claims, 8 Drawing Sheets

(51) Int. Cl.
*C09K 5/14* (2006.01)
*F28D 20/00* (2006.01)
*F28D 21/00* (2006.01)
*F28F 5/02* (2006.01)

(58) Field of Classification Search
CPC .. F28D 19/048; C09K 5/14; F28F 5/02; F02C 7/105; F24F 2203/1032; F24F 2203/104
USPC ............................ 165/8, DIG. 16, DIG. 41
See application file for complete search history.

(56) References Cited

U.S. PATENT DOCUMENTS

| | | | | |
|---|---|---|---|---|
| 3,478,816 | A * | 11/1969 | Helms | F28D 19/045 165/10 |
| RE27,747 | E * | 9/1973 | Johnson | B22F 3/1115 165/166 |
| 5,722,482 | A * | 3/1998 | Buckley | A61F 7/02 165/10 |
| 7,085,483 | B2 * | 8/2006 | Terashima | F28D 20/003 165/10 |
| 2005/0178524 | A1 * | 8/2005 | Pause | E04D 11/02 165/48.1 |
| 2010/0319893 | A1 * | 12/2010 | Tsubone | F28D 9/0025 165/170 |
| 2015/0266144 | A1 * | 9/2015 | Bengaouer | F28D 20/021 165/10 |
| 2016/0156213 | A1 | 6/2016 | Yajima et al. | |
| 2017/0030656 | A1 * | 2/2017 | Lien | F28D 20/021 |
| 2017/0036507 | A1 | 2/2017 | Fuse et al. | |
| 2017/0210204 | A1 | 6/2017 | Fuse et al. | |
| 2017/0218825 | A1 | 8/2017 | Fuse et al. | |

FOREIGN PATENT DOCUMENTS

| | | |
|---|---|---|
| JP | S62-045578 U | 3/1987 |
| JP | H08-327265 A | 12/1996 |
| JP | 2010-163510 A | 7/2010 |
| JP | 2010163510 * | 7/2010 |

* cited by examiner

HEAT STORAGE UNIT AND HEAT STORAGE SYSTEM

CROSS REFERENCE TO RELATED APPLICATIONS

This application is a U.S. national stage of International Patent Application No. PCT/JP2015/004817 filed on Sep. 22, 2015 and is based on and incorporates herein by reference Japanese Patent Application No. 2014-201437 filed on Sep. 30, 2014.

TECHNICAL FIELD

The present disclosure relates to a heat storage unit and a heat storage system.

BACKGROUND ART

Up to now, a heat storage material made of material that undergoes an electron phase transition has been known (refer to Patent Document 1). The heat storage material utilizes an enthalpy change associated with the electron phase transition for heat storage. However, the heat storage material described in Patent Document 1 has insufficient thermal conductivity. Therefore, heat of a heat transport medium cannot be efficiently stored in the heat storage material in some cases.

PRIOR ART DOCUMENT

Patent Document

Patent Document 1: JP 2010-163510 A

SUMMARY

An object of the present disclosure is to provide a heat storage unit and a heat storage system capable of efficiently storing heat of a heat transport medium.

According to one aspect of the present disclosure, a heat storage unit includes a heat storage portion having a first material including a strongly correlated electron system material, and a heat conduction portion including a second material that is higher in thermal conductivity than the first material and the heat conduction portion is in contact with the heat storage portion.

The heat storage unit according to the present disclosure can transfer the heat of the heat transport medium to the heat storage portion through the heat conduction portion having a second material having a thermal conductivity higher than that of the first material. Therefore, the heat storage unit according to the present disclosure can efficiently store the heat of the heat transport medium.

DESCRIPTION OF EMBODIMENTS

Figure 1:
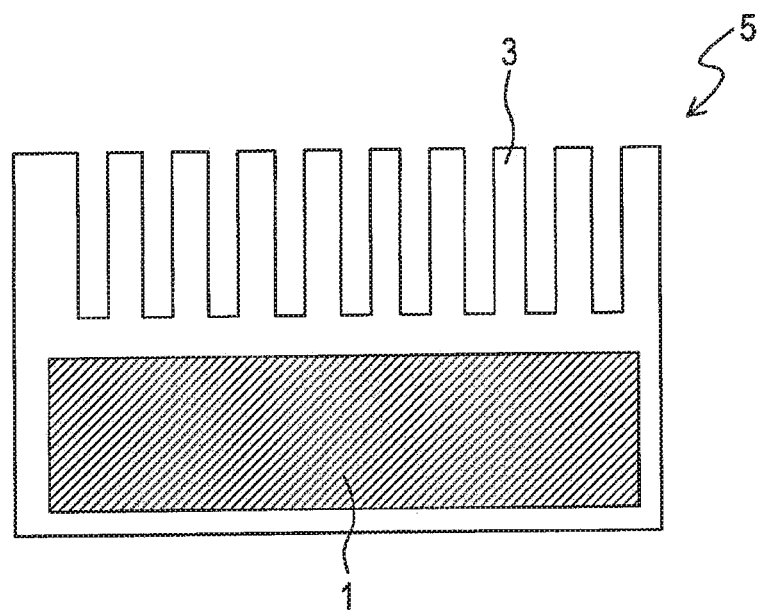
FIG. 1 is a schematic diagram illustrating a heat storage unit according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A heat storage unit according to a first embodiment of the present disclosure includes a heat storage portion having a first material with a strongly correlated electron system material. The first material may be a material consisting of a strongly correlated electron system material or may further contain other components. The heat storage portion may be made of only the first material.

A strongly correlated electron system material has a system in which at least one of degrees of freedom, i.e. spin, orbit and charge, of electrons becomes manifested by a strong coulomb repulsion between the electrons. The manifested respective degrees of freedom: the spin, orbit and charge, show a large entropy change associated with a change in number of states in accordance with an order-disorder phase transition (the phase transition of the manifested degrees of freedom: spin, orbit and charge, is called "electron phase transition").

As the strongly correlated electron system material, there is, for example, one that undergoes a metal-insulator phase transition. As a strongly correlated electron system material, there is, for example, a transition metal oxide.

Specific examples of the strongly correlated electron system material are $V_{(1-X)}W_XO_2$ ($0 \leq X \leq 0.0650$), $V_{(1-X)}Ta_XO_2$ ($0 \leq X \leq 0.117$), $V_{(1-X)}Nb_XO_2$ ($0 \leq X \leq 0.115$), $V_{(1-X)}Ru_XO_2$ ($0 \leq X \leq 0.150$), $V_{(1-X)}Mo_XO_2$ ($0 \leq X \leq 0.161$), $V_{(1-X)}Re_XO_2$ ($0 \leq X \leq 0.0964$), $LiMn_2O_4$, $LiVS_2$, $LiVO_2$, $NaNiO_2$, $LiRh_2O_4$, $V_2O_3$, $V_4O_7$, $V_6O_{11}$, $Ti_4O_7$, $SmBaFe_2O_5$, $EuBaFe_2O_5$, $GdBaFe_2O_5$, $TbBaFe_2O_5$, $DyBaFe_2O_5$, $HoBaFe_2O_5$, $YBaFe_2O_5$, $PrBaCo_2O_{5.5}$, $DyBaCo_2O_{5.54}$, $HoBaCo_2O_{5.48}$, $YBaCo_2O_{5.49}$, and the like. All of those materials undergo the metal-insulator phase transition and are transition metal oxides.

For example, the heat storage portion can be manufactured in a method in which a jig is filled with a powder of the first material, and the powder of the first material is then sintered by a technique such as a hot press, a spark plasma sintering (SPS), a hot isostatic pressurization method (HIP).

The heat storage unit according to the present disclosure includes a heat conduction portion. The heat conduction portion has a second material having a thermal conductivity higher than that of the first material and comes in contact with the heat storage portion. Examples of the second material include metal, ceramics and the like. Examples of the metal include aluminum, gold, silver, copper, iron, stainless steel, brass, titanium, and alloys of those materials. A shape of the heat conduction portion is not particularly limited. For example, as illustrated in FIG. 1, a heat conduction portion 3 may have a fin shape. The heat conduction portion 3 may consist of only the second material.

The second material may consist of a single component or may include two or more components (for example, alloy). Further, the heat conduction portion may be formed of a single component or multiple components, for example. In the case where the heat conduction portion is formed of the multiple components, the second material configuring each part may be the same as or different from each other.

As one configuration of the heat storage unit, for example, as illustrated in FIG. 1, there is a heat storage unit 5 in which a heat storage portion 1 and the heat conduction portion 3 are integrated together. As another configuration of the heat storage unit, for example, as illustrated in FIG. 1, there is the heat storage unit 5 in which the single heat storage portion 1 is enclosed with the heat conduction portion 3.

Figure 2:
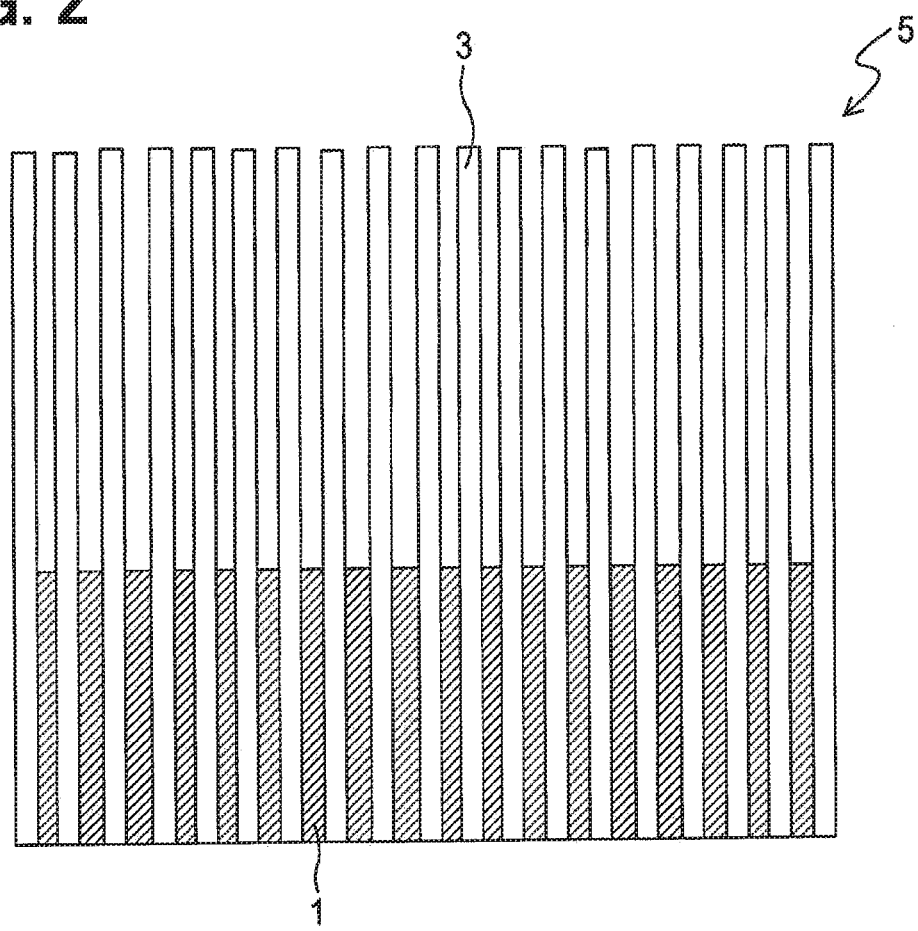
FIG. 2 is a schematic diagram illustrating one example of the heat storage unit according to the first embodiment.
Figure 3:
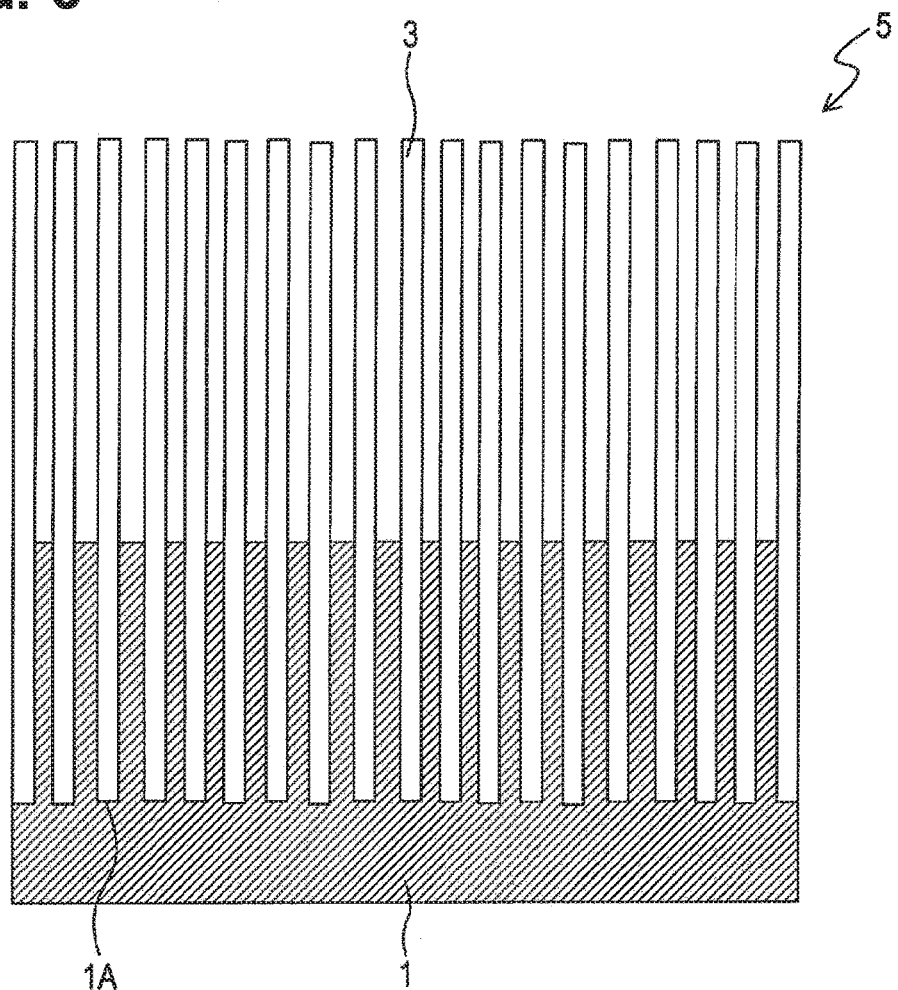
FIG. 3 is a schematic diagram illustrating another example of the heat storage unit according to the first embodiment.

As a configuration of the heat storage unit, for example, as illustrated in FIGS. 2 and 3, there is a heat storage unit 5 having a laminated structure in which multiple members of the heat storage portion 1 and multiple members of the heat conduction portion 3 are alternately stacked on each other. In the heat storage unit 5 having a configuration illustrated in FIG. 2, the heat storage portion 1 and the heat conduction portion 3 are each divided into multiple plate members, which are alternately stacked on each other.

Further, in the heat storage unit 5 of the configuration illustrated in FIG. 3, multiple concave portions 1A are periodically provided in a part of the heat storage portion 1, and multiple plate-shaped heat conduction portions 3 are inserted into the respective multiple concave portions 1A, resulting in a laminated structure in which the multiple concave portions 1A of the heat storage portion 1 and the heat conduction portions 3 are alternately stacked on each other.

The advantages of the heat storage unit will be described below. The heat storage unit transfers the heat of the heat transport medium to the heat storage portion through the heat conduction portion having a second material having a thermal conductivity higher than that of the first material. Therefore, the heat storage unit can efficiently store the heat of the heat transport medium.

Furthermore, in the case where the heat storage unit has a laminated structure in which the heat storage portion 1 and the heat conduction portion(s) 3 are alternately laminated on each other as illustrated in FIGS. 2 and 3, for example, the heat can be efficiently transferred to the inside of the heat storage portion 1.

Also, the strongly correlated electron system material has a large amount of heat storage per unit volume. Because the heat storage portion in the heat storage unit according to the present disclosure has the first material including the strongly correlated electron system material, the heat storage amount per unit volume is large.

(Second Embodiment)

A heat storage system according to the present disclosure includes a first space and a second space partitioned by a partition wall. As an example of the first space and the second space, there are spaces individually partitioned such that an interior of a pipe is divided into two or more spaces by partition walls extending along an axial direction of the pipe.

In addition, the first space and the second space may be provided by dividing an open space by partition walls. The first space and the second space may be completely separated from each other by a partition wall or may partially communicate with each other.

It is preferable that at least a part of the partition wall contains a heat insulating material. In that case, heat conduction between the first space and the second space can be suppressed. As the heat insulating material, there are, for example, foamed resin, glass wool, and the like.

Figure 6:
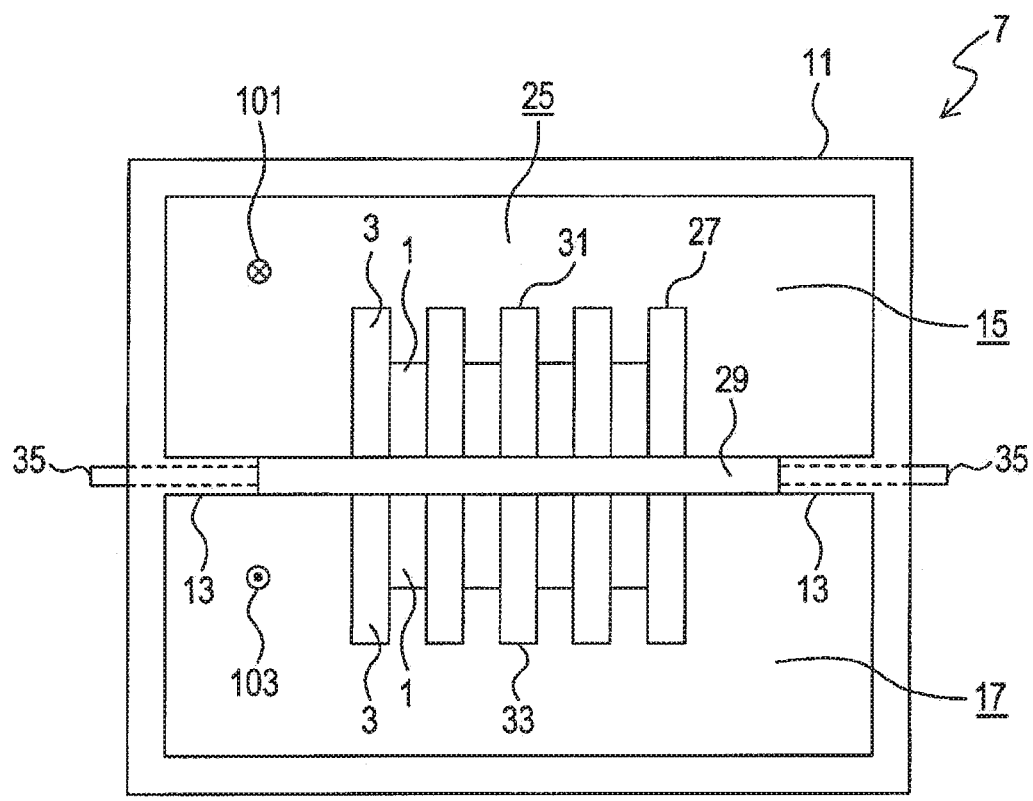
FIG. 6 is a cross-sectional view taken along a line VI-VI in FIG. 5.
Figure 8:
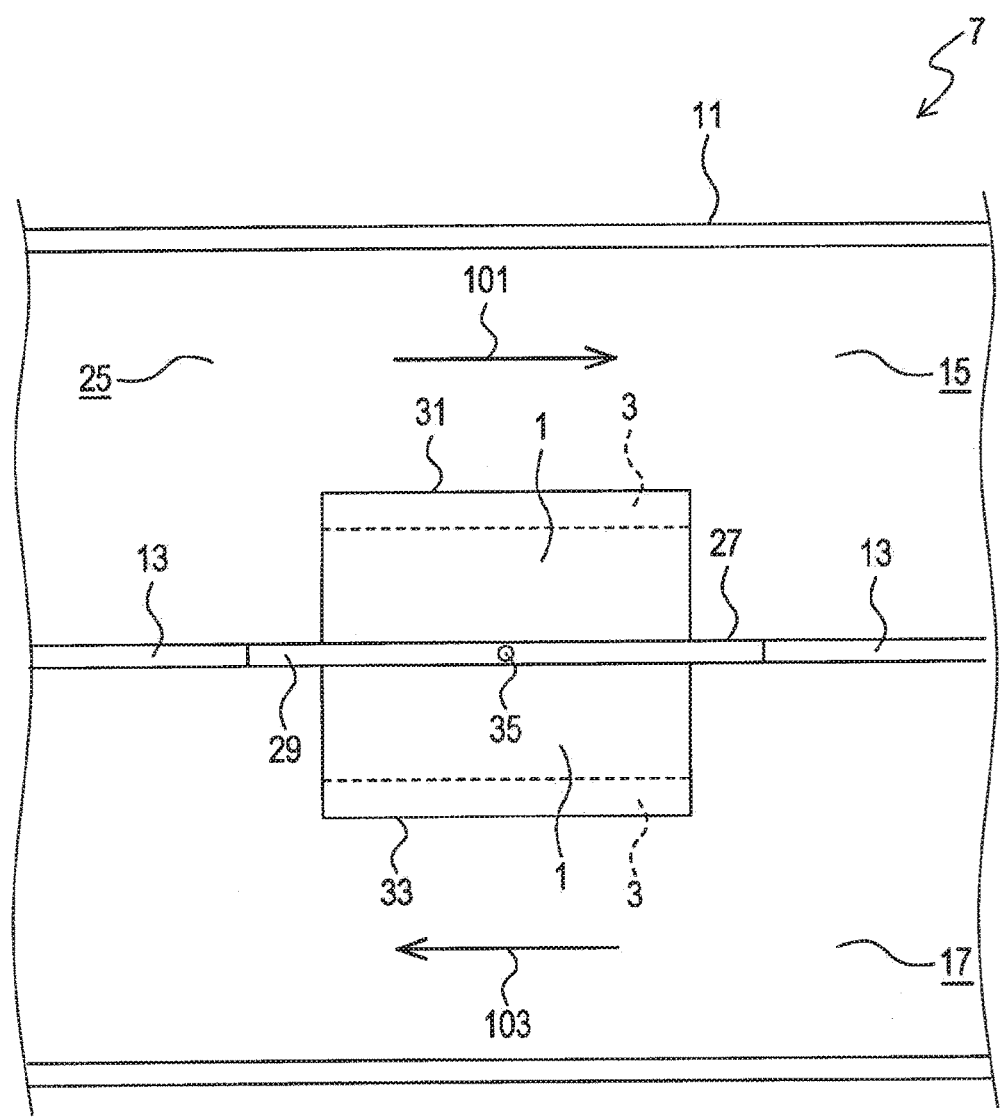
FIG. 8 is a cross-sectional view taken along a line VIII-VIII in FIG. 5.

The heat storage system according to the present disclosure includes a rotating unit. For example, as illustrated in FIGS. 6 and 8, a rotating unit 27 is placed across a first space 15 and a second space 17. In other words, at the time of using the heat storage system, at least one part of the rotating unit is placed in the first space and at least another part of the rotating unit is placed in the second space.

Figure 9:
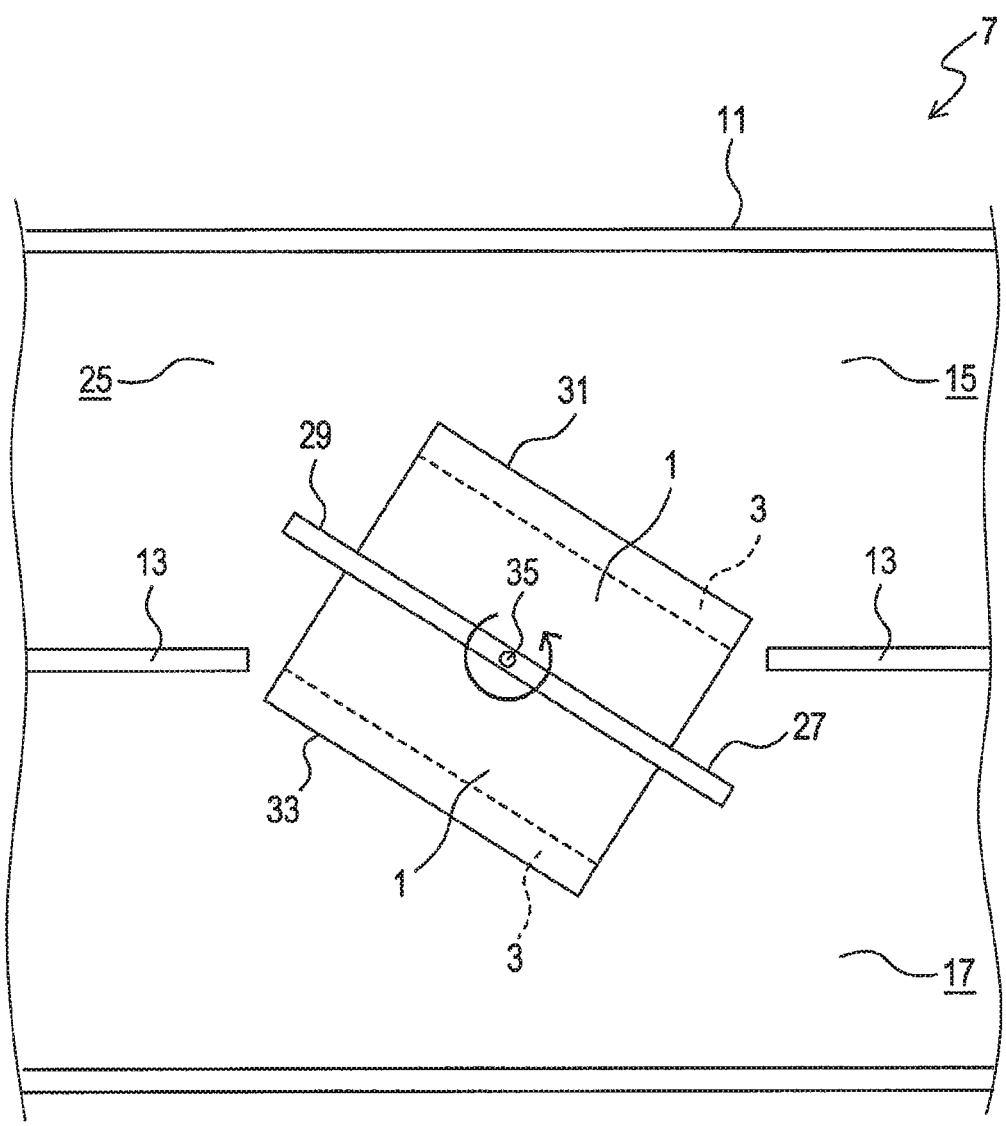
FIG. 9 is a schematic view illustrating a state in which a rotating unit rotates according to the second embodiment.

As illustrated in FIG. 9, for example, the rotating unit is rotatable around a rotary shaft 35 that is in parallel to a partition wall 13. The rotating unit can be disposed, for example, in a place where the partition wall 13 is not partially present. In addition, a portion of the partition wall 13 divided from the other portion may configure a part of the rotating unit 27.

As illustrated in FIGS. 6 and 8, for example, the rotating unit 27 includes heat storage units 31 and 33 which are placed in the first space 15 and the second space 17, respectively, and have the same configuration as that of the heat storage unit 5 in the first embodiment. In other words, the rotating unit 27 includes the heat storage unit 31 exposed to the first space 15, and the heat storage unit 33 exposed to the second space 17. For example, as illustrated in FIG. 9, when the rotating unit 27 rotates, the heat storage unit 31 that has been placed in the first place 15 moves toward the second space 17 while the heat storage unit 33 that has been placed in the second space 17 moves toward the first space 15. When the rotating unit 27 further rotates, the heat storage unit 33 that has been placed in the first space 15 moves toward the second space 17 while the heat storage unit 31 that has been placed in the second space 17 moves toward the first space 15.

It is preferable that the rotating unit is provided with a heat insulating material between the heat storage unit in the first space and the heat storage unit in the second space. In that case, heat conduction from one heat storage unit to the other heat storage unit can be reduced. The heat insulating material may employ, for example, foamed resin, glass wool, and the like.

The rotating unit can be rotated by a driving force of a driving source such as a motor, an internal combustion engine, or the like, for example. The rotation of the rotating unit may be executed in response to a signal from a control unit provided in the heat storage system or an external control unit, or may be executed according to user's operation.

For example, the heat storage system may be equipped with a measurement unit that measures at least any one of a temperature of the heat storage unit in the first space, a temperature of the heat storage unit in the second space, a temperature difference between the heat storage unit in the first space and a heat transport medium flowing through the first space, and a temperature difference between the heat storage unit in the second space and the heat transport medium flowing through the second space. In that case, for example, the control unit described above may output a signal for rotating the rotating unit on condition that the above-mentioned any temperature or temperature difference measured by the measurement unit has reached a reference value. Also, the rotating unit may be rotated manually by the user. Also, the rotating unit may automatically rotate at regular time intervals.

Figure 4:
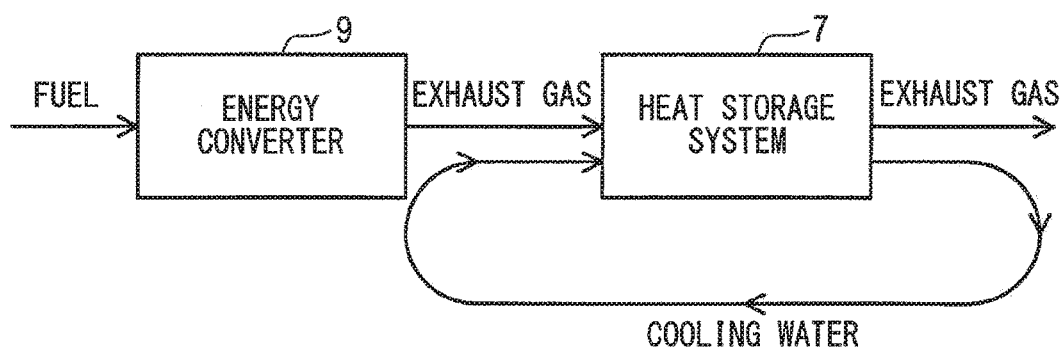
FIG. 4 is a schematic diagram illustrating an arrangement of a heat storage system according to a second embodiment of the present disclosure.

A specific example of a heat storage system 7 will be described with reference to FIGS. 4 to 9. As illustrated in FIG. 4, an exhaust gas 101 discharged from an energy converter 9 passes through the heat storage system 7. At that time, the heat storage system 7 accumulates a heat of the exhaust gas 101.

A coolant water 103 in the energy converter 9 has a circulation path that passes through an inside of the heat storage system 7. When the coolant water 103 passes through the inside of the heat storage system 7, the heat storage system 7 releases the accumulated heat to the coolant water 103 and raises a temperature of the coolant water 103. With an increase in the temperature of the coolant water 103, the energy converter 9 can be smoothly started. The energy converter 9 is, for example, an internal combustion engine or a fuel cell.

Figure 5:
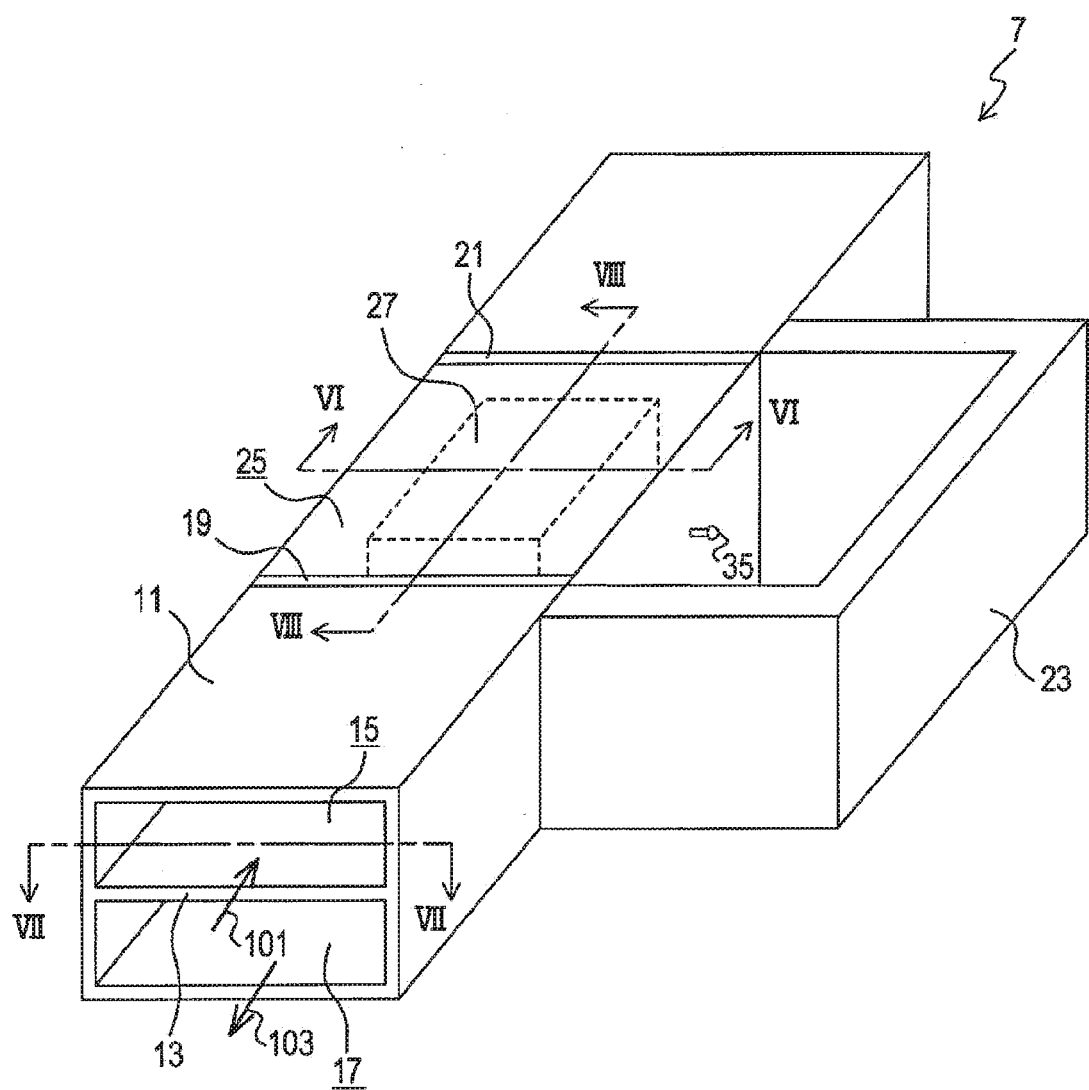
FIG. 5 is a perspective view illustrating the heat storage system according to the second embodiment.

As illustrated in FIG. 5, the heat storage system 7 includes a pipe 11. The inside of the pipe 11 is partitioned into upper and lower parts by the partition wall 13 extending along an axial direction of the pipe 11. In the following descriptions, in the inside of the pipe 11, a space above the partition wall 13 in FIG. 5 is defined as the first space 15, and a space below the partition wall 13 is defined as the second space 17. The partition wall 13 is made of a heat insulating material.

The first space 15 is a flow channel of the exhaust gas 101 and the second space 17 is a flow channel of the coolant water 103. The exhaust gas 101 and the coolant water 103 are examples of a heat transport medium. A temperature of the exhaust gas 101 is higher than a temperature of the coolant water 103. A direction in which the exhaust gas 101 flows and a direction in which the coolant water 103 flows are opposite to each other.

The pipe 11 has opening and closing doors 19 and 21 at two places. The opening and closing doors 19 and 21 are shutter type doors and open and close the pipe 11. When the opening and closing doors 19 and 21 are opened, both of the first space 15 and the second space 17 are opened. On the other hand, when the opening and closing doors 19 and 21 are closed, both of the first space 15 and the second space 17 are closed.

The pipe 11 is provided with a bypass portion 23 that connects a front side of the opening and closing door 19 and a back side of the opening and closing door 21 in FIG. 5. The interior of the bypass portion 23 is partitioned into the first space 15 and the second space 17 by the partition wall 13 in the same manner as that of the other portions of the pipe 11.

When the opening and closing doors 19 and 21 are opened, the exhaust gas 101 flowing through the first space 15 can flow through both of a region (hereinafter referred to as "main flow channel 25") sandwiched between the opening and closing doors 19 and 21, and the bypass portion 23. However, the exhaust gas 101 mainly flows through the main flow channel 25 having a lower resistance. On the other hand, when the opening and closing doors 19 and 21 are closed, the exhaust gas 101 flowing through the first space 15 does not flow through the main flow channel 25 but flows through the bypass portion 23.

Similarly, when the opening and closing doors 19 and 21 are opened, the coolant water 103 flowing through the second space 17 mainly flows through the main flow channel 25, and when the opening and closing doors 19 and 21 are closed, the coolant water 103 does not flow through the main flow channel 25, but flows through the bypass portion 23.

The heat storage system 7 is equipped with the rotating unit 27 in the main flow channel 25 of the pipe 11. As illustrated in FIGS. 6 to 9, the rotating unit 27 includes a plate-shaped seat 29, a heat storage unit 31 installed on one surface of the seat 29, a heat storage unit 33 installed on an opposite surface of the seat 29. The seat 29 is made of a heat insulating material. The rotating unit 27 is provided across the first space 15 and the second space 17.

Each of the heat storage units 31 and 33 has a laminated structure in which plate-shaped heat storage portions 1 and plate-shaped heat conduction portions 3 are alternately laminated on each other. A stacking direction of the heat storage portions 1 and the heat conduction portions 3 is in parallel to the partition wall 13 and is orthogonal to the flow direction of the exhaust gas 101 and the coolant water 103. When the seat 29 is used as a reference, a height of the heat conduction portions 3 is larger than the height of the heat storage portions 1. The heat storage portions 1 are made of $VO_2$, and the heat conduction portions 3 are made of copper.

Figure 7:
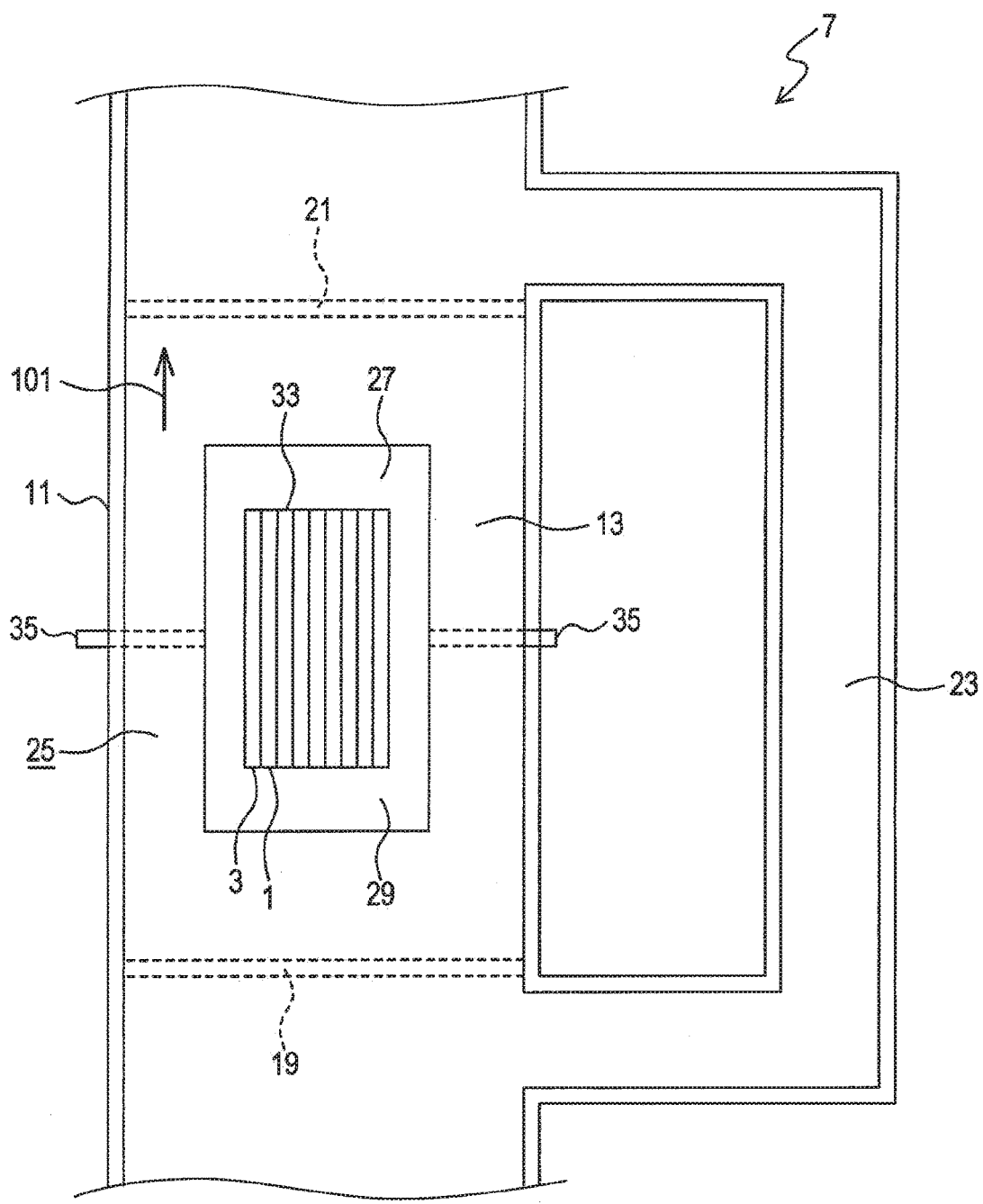
FIG. 7 is a cross-sectional view taken along a line VII-VII in FIG. 5.

As illustrated in FIG. 7, the partition wall 13 is notched in a rectangular shape in a portion where the rotating unit 27 is present, and the seat 29 is fitted into the notched portion. The seat 29 has the rotary shaft 35 penetrating through the seat 29 in a lateral direction (direction perpendicular to the axial direction of the pipe 11). The rotary shaft 35 passes through an inside of the partition wall 13 on both sides of the seat 29 and reaches an outside of the pipe 11. The axial direction of the rotary shaft 35 is in parallel to a surface of the partition wall 13. The rotating unit 27 is rotatable around the rotary shaft 35.

Normally, as illustrated in FIGS. 6 and 8, the seat 29 and the partition wall 13 are flush with each other. In this case, one of the heat storage units 31 and 33 is placed in the first space 15 and the other is placed in the second space 17. In this case, the opening and closing doors 19 and 21 are in an opened state.

On the other hand, as illustrated in FIG. 9, the heat storage system 7 can rotate the rotating unit 27 around the rotary shaft 35. The heat storage unit that has been placed in the first space 15 can be moved to the second space 17, and the heat storage unit that has been placed in the second space 17 can moved to the first space 15. In this situation, the opening and closing doors 19 and 21 are kept in a closed state.

The heat storage system 7 puts the opening and closing doors 19 and 21 in the open state, allows the exhaust gas 101 to flow through the main flow channel 25, and accumulates the heat of the exhaust gas 101 in the heat storage unit placed in the first space 15. Then, after the heat storage system 7 puts the opening and closing doors 19 and 21 in a closed state, the heat storage system 7 rotates the rotating unit 27 by 180°. Then, the heat storage unit that has been placed in the first space 15 moves toward the second space 17, and the heat storage unit releases the heat that has been accumulated to the coolant water 103 in the second space 17. On the other hand, the heat storage unit which has been placed in the second space 17 just before the rotation of the rotating unit 27 (i.e. the heat storage unit which has been cooled by the coolant water 103) moves toward the first space 15, and the heat storage unit accumulates the heat of the exhaust gas 101 in the first space 15.

The advantages of the heat storage system will be described below. Since the heat storage system includes the above-described heat storage unit, the heat storage system obtains the advantages of the heat storage unit.

Furthermore, with the rotation of the rotating unit, the heat storage system can keep the high thermal conductivity between the heat storage unit and the heat transport medium. This configuration will be described below. For example, as illustrated in FIGS. 6 and 8, it is assumed that a high-temperature heat transport medium (for example, exhaust gas 101) flows in the first space 15, a low-temperature heat transport medium (for example, coolant water 103) flows in the second space 17. The heat storage unit 31 in the first space 15 absorbs the heat from the high-temperature heat transport medium and the heat storage unit in the second space 17 releases the heat to the low-temperature heat transport medium.

As time passes, the temperature of the heat storage unit 31 in the first space 15 rises, and a temperature difference from the high temperature heat transport medium decreases. Therefore, a heat flow between the heat storage unit 31 in the first space 15 and the high-temperature heat transport medium decreases as time passes.

As time passes, the temperature of the heat storage unit 33 in the second space 17 drops, and a temperature difference from the low-temperature heat transport medium decreases. Therefore, a heat flow between the heat storage unit 33 in the second space 17 and the low-temperature heat transport medium also decreases as time passes.

As described above, when the heat flow in the heat storage units 31 and 33 in the first space 15 and the second space 17 decreases, the heat storage system 7 rotates the rotating unit 27. Accordingly, the heat storage unit 31 that has been located in the first space 15 can be moved to the second space 17 and the heat storage unit 33 that has been previously located in the second space 17 can be moved to the first space 15.

In this way, since the low-temperature heat storage unit 33 is located in the first space 15, the temperature difference between the heat storage unit 33 in the first space 15 and the high-temperature heat transport medium increases, and the heat flow between the heat storage unit 33 and the high-temperature heat transport medium is recovered. In addition, since the high-temperature heat storage unit 31 is located in the second space 17, the temperature difference between the heat storage unit 31 in the second space 17 and the low-temperature heat transport medium increases, and the heat flow between the heat storage unit 31 and the low-temperature heat transport medium is recovered.

With the repetition of the above operation, the large heat flow between the heat storage units 31, 33 and the heat transport medium can be kept.

(Third Embodiment)

Figure 10:
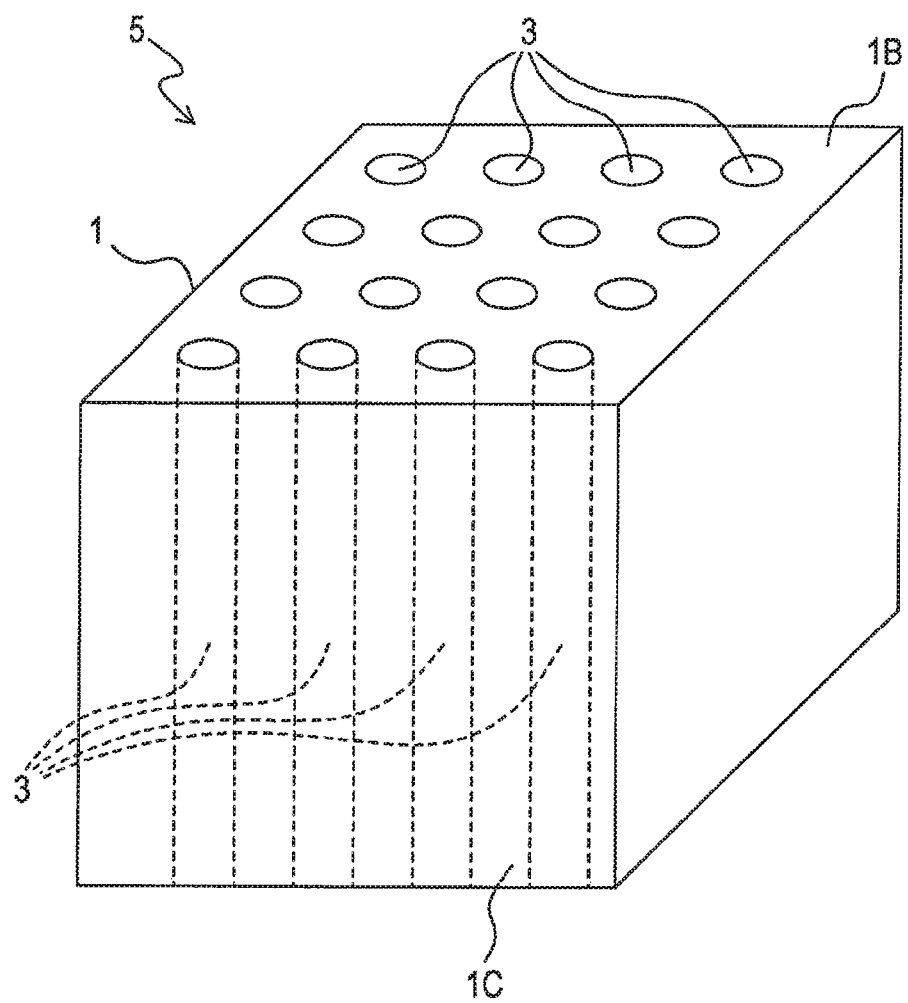
FIG. 10 is a schematic diagram illustrating a heat storage unit according to a third embodiment of the present disclosure.

As illustrated in FIG. 10, a heat storage unit 5 according to the present embodiment has a form in which multiple heat conduction portions 3 are buried in a heat storage portion 1. The heat conduction portion 3 has a straight bar shape. The heat storage portion 1 has a rectangular parallelepiped shape. The heat conduction portions 3 appear on an upper surface 1B of the heat storage portion 1 and a bottom surface 1C on the opposite side of the upper surface 1B. The heat storage portion 1 and the heat conduction portions 3 can be made of the same material as those of the first embodiment.

The configuration of the heat storage unit 5 may be other than that illustrated in FIG. 10. For example, the heat conduction portions 3 may be formed in a curved bar shape, a zigzag type rod shape, or the like. Also, the number of the heat conduction portions 3 may be one. Further, the heat conduction portion 3 may appear on one surface (for example, the upper surface 1B) of the surfaces of the heat storage portion 1 but not appear on the other surface. In addition, the axial directions of the multiple heat conduction portions 3 may be nonparallel to each other. Further, the shape of the heat storage portion 1 may be a shape other than a rectangular parallelepiped shape (for example, a columnar shape, a spherical shape, etc.).

The advantages of the heat storage unit 5 will be described below. The heat storage unit 5 includes the heat conduction portions 3 having a second material having a thermal conductivity higher than that of the first material. Most of the heat conduction portions 3 are buried in the heat storage portion 1 and the heat conduction portions 3 appear on at least one of the surfaces of the heat storage portion 1. The heat storage unit 5 receives the heat of the heat transport medium at a portion of the heat conduction portions 3 appearing on the surface of the heat storage portion 1 and transfers the heat to the inside of the heat storage portion 1 through the heat conduction portions 3. Therefore, the heat storage unit 5 can efficiently store the heat of the heat transport medium.

Also, the strongly correlated electron system material has a large amount of heat storage per unit volume. Because the heat storage portion 1 in the heat storage unit 5 has the first material including the strongly correlated electron system material, the heat storage amount per unit volume is large.

The embodiments of the present disclosure have been described above. However, the present disclosure is not limited to the above embodiments, but can be variously embodied.

In addition, a function of one constituent element in the above-described embodiments may be distributed to a plurality of constituent elements, or functions of a plurality of constituent elements may be integrated into one constituent element. In addition, at least a part of the above-described embodiments may be switched to a known configuration having similar effects. A part of the configuration according to the above-described embodiment may be omitted. Also, at least a part of the configuration in the above embodiments may be added to or replaced with another configuration in the above embodiments.

In addition to the above-described heat storage unit and heat storage system, the present disclosure can be realized in various configurations such as a heat storage method.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements of the disclosure are shown in various combinations and configurations, which are exemplary, other combinations and configurations, including more, less or only a single element, are also within the spirit and scope of the present disclosure.

The invention claimed is:

1. A heat storage unit comprising:
   a heat storage portion comprising a first material including a strongly correlated electron system material; and
   a heat conduction portion comprising a second material that is higher in thermal conductivity than the first material, the heat conduction portion being in contact with the heat storage portion, wherein
the heat conduction portion includes a plurality of members, and
each of the plurality of members of the heat conduction portion protrudes outward from the heat storage portion.

2. The heat storage unit according to claim 1, wherein the heat storage portion includes a plurality of members, the plurality of members of the heat storage portion and the plurality of members of the heat conduction portion are alternately laminated.

3. The heat storage unit according to claim 1, wherein the strongly correlated electron system material is a material that undergoes a metal-insulator phase transition.

4. The heat storage unit according to claim 1, wherein the strongly correlated electron system material is a transition metal oxide.

5. The heat storage unit according to claim 1, wherein the second material is a metal or a ceramic.

6. A heat storage system comprising:
a partition wall;
a first space and a second space which are partitioned by the partition wall; and
a rotating unit provided across the first space and the second space and being rotatable about a rotary shaft that is parallel to the partition wall, wherein
the rotating unit includes two heat storage units according to claim 1, and a plate-shaped seat having two opposing faces, the two heat storage units are located on the two opposing faces,
the seat is made of a heat insulating material and is rotatable about the rotary shaft,
one of the two heat storage units extends from a side of the seat to be exposed to the first space, and
the other of the two heat storage units extends from another side of the seat to be exposed to the second space.

7. The heat storage unit according to claim 2, wherein the plurality of members of the heat conduction portion are plate members,
the plurality of members of the heat storage portion define a plurality of recesses therebetween on the heat storage portion, and
the plate members of the heat conduction portion are inserted into the recesses of the heat storage portion.

8. The heat storage system of claim 6,
further comprising a pipe,
the partition wall extends along an axial direction of the pipe, and
an inside of the pipe is partitioned by the partition wall into the first space and the second space.

9. The heat storage system of claim 8, wherein the pipe is provided with at least two doors that open and close the pipe.

10. The heat storage system of claim 9, further comprising a bypass portion which connects a front side of one of the at least two doors with a back side of the other of the at least two doors, the bypass portion is partitioned to communicate the first space at the front side to the first space at the back side, and to communicate the second space at the front side to the second space at the back side.

11. The heat storage system of claim 6, wherein
the partition wall has a notched portion and the seat is fitted into the notched portion.

* * * * *